Figure 1:
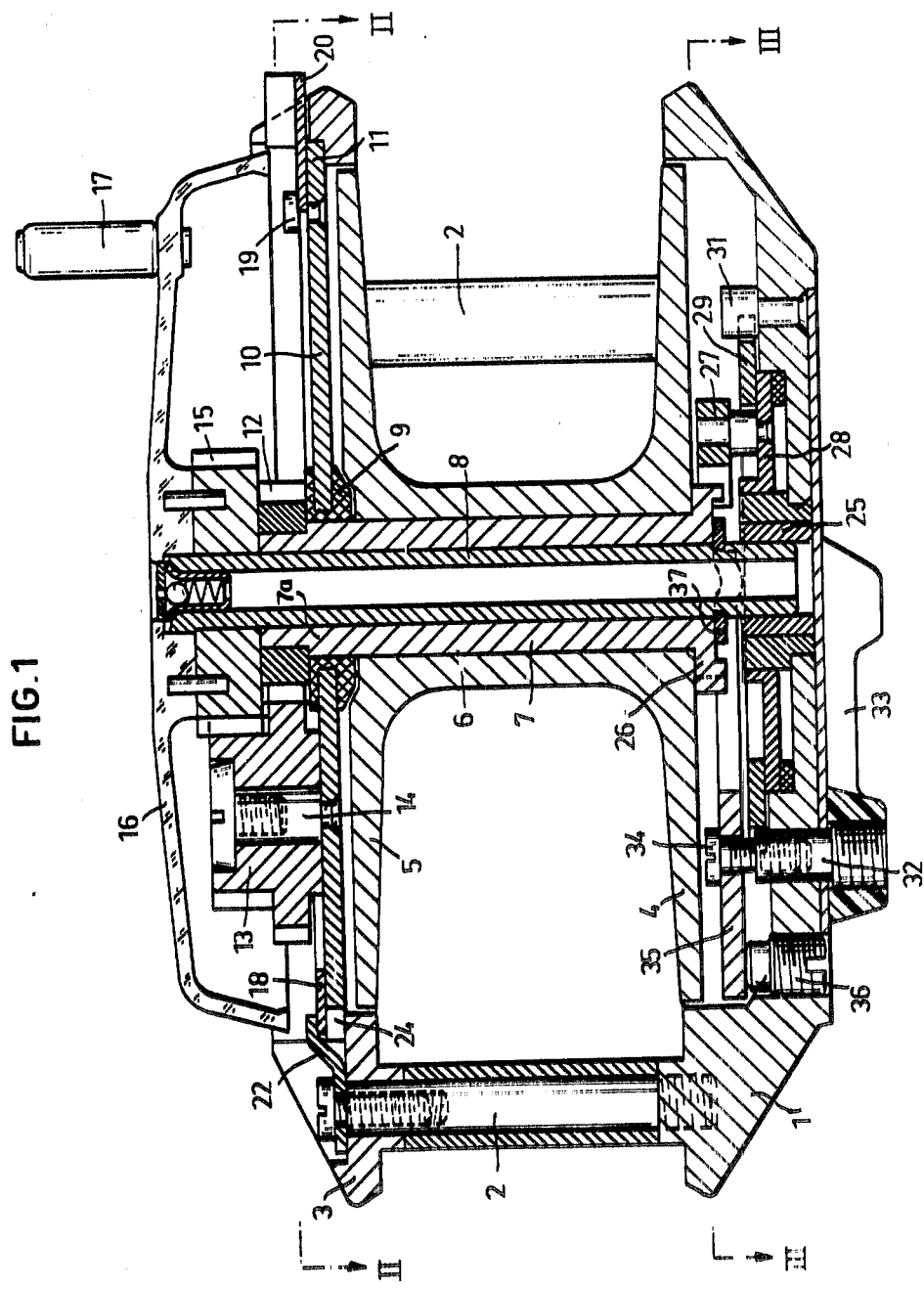

United States Patent

[11] 3,603,524

| [72] | Inventors | Karl Nurmse;<br>Hugo Ragnvald Svensson, both of Svangsta, Sweden |
|---|---|---|
| [21] | Appl. No. | 835,624 |
| [22] | Filed | June 23, 1969 |
| [45] | Patented | Sept. 7, 1971 |
| [73] | Assignee | ABU Aktiebolag<br>Svangsta, Sweden |
| [32] | Priority | June 25, 1968 |
| [33] | | Sweden |
| [31] | | 8599 |

[54] FISHING REELS, ESPECIALLY FLY-FISHING REELS
4 Claims, 3 Drawing Figs.

[52] U.S. Cl. .................................................. 242/84.1, 242/84.5
[51] Int. Cl. ............................................... A01k 89/02
[50] Field of Search .......................................... 242/84.1, 84.5, 84.51, 84.44, 84.45, 84.46, 84.54

[56] References Cited
UNITED STATES PATENTS

| 782,130 | 2/1905 | Hendryx | 242/84.1 |
| 2,531,929 | 11/1950 | Willman | 242/84.1 |
| 2,537,590 | 1/1951 | Kaufman | 242/84.1 |
| 2,614,768 | 10/1952 | Shakespeare, Jr. | 242/84.1 |
| 3,478,977 | 11/1969 | Sarah | 242/84.45 |
| 3,478,978 | 11/1969 | Nurmse | 242/84.51 |

*Primary Examiner*—Billy S. Taylor
*Attorney*—J. Bradley Cohn

ABSTRACT: There is provided an arrangement in fishing reels by which the different components can be dismantled and exposed by simple manual manipulation, the arrangement being such that the primary reel shaft or spindle connected with the crank and an input gear of the transmission system is detachably mounted in bearings disposed in a side member of the reel while a secondary shaft, which carries an output gear of said transmission and the reel spool and telescoping the primary shaft, is arranged for rotation on the primary shaft and mounted between the reel spool and the crank in a detachable end plate. Suitable locking means are provided which, when moved by simple hand movements to register with component release means, permit the various components to be withdrawn from the reel framework.

FISHING REELS, ESPECIALLY FLY-FISHING REELS

The present invention relates to an arrangement in fishing reels, especially such reels for fly-fishing, including a bottom wall member which rigidly connected through the medium of stay or tie members with an annular top wall member, a line spool whose one flange is let into the bottom wall member and the other flange of which is encircled by the top wall member with a small clearance, and a crank situated on the outer surface of the top wall member and in driving connection with the spool.

In the original still common design of such reels, the outer spool flange is provided with a crank handle for rotating the spool. The spool is mounted on a free-supporting shaft fixed in the bottom wall member. This shaft is easily bent when the spool and the crank are subjected to large, radially acting forces to cause the outer flange of the spool to contact the outer, annular end wall since the space between the periphery of the spool flange and the top end wall must always be sufficiently small to prevent the line from passing through said space and lying on the outer side of the flange.

In known reels of the type specified having geared transmission between the crank handle and the spool, two concentric shafts are mounted on the central shaft fixed in the bottom wall member, the crank being connected with the inner shaft which transmits its movement via gearing to the outer shaft upon which the spool is attached. Thus the complete mechanism is still carried by a free-bearing shaft fixed in the bottom end wall, and the aforementioned disadvantages have not been removed.

The invention is concerned with a construction of fishing reels of the type specified in which these disadvantages are eliminated and which affords the advantages of a simple and sturdy construction, an easily dismantled spool and ease of access to the various components of the mechanism.

This is achieved by means of the present invention which is mainly characterized in that a shaft connected with the crank is withdrawably inserted at its inner end into a radial bearing securely arranged in the bottom wall member, and in the proximity of its other end between the spool and the crank is mounted for rotation but held essentially against axial movement in an end plate which is detachably inserted in a shaft in the annular top wall member.

If the reel has no transmission between the crank and spool, the spool is suitably affixed directly to the shaft connected to the crank. By releasing the outer end plate from the annular top wall member, the spool together with the crank and end plate can be readily drawn out of the reel frame formed by the end walls. When the end plate is positively in its correct position in the annular top wall member, the upper portion of the shaft is both radially and axially mounted relative to the reel frame while the lower end of the shaft is radially mounted relative to said frame.

If the reel is provided with a transmission between the crank and the spool, the crank and a primary shaft connected therewith are connected with an input gear of the transmission which via an idler gear presenting a double ring of teeth drives an output gear which is fixed to an outer secondary shaft carrying the spool and positioned coaxially with the primary shaft. When the end wall plate is released from the annular top end wall member, the spool together with the two shafts, the end wall plate and crank can be drawn axially out of the reel frame. The space in the bottom end wall member beneath the inner flange of the spool is then exposed to render accessible the members, preferably a nonreversing catch and a reverse brake housed therein. By drawing out the crank, preferably constructed as a protective cap, and the inner primary shaft connected therewith from the secondary shaft carrying the spool, the members, suitably the transmission gears, located in the crank cap are also made accessible.

Since it is important that the end wall plate can be released from the annular top wall plate by a simple hand movement simultaneously as the end wall plate in assembled position gives an all-around radial support to the remaining portions of the shafts, the invention includes a special securing means for the end wall plate in which the end wall plate is axially inlaid from without in a shelf in the annular top end wall member and supports a locking ring which is provided with a gripping means and guided for rotation on said member and which carries a latching recess or recesses cooperating with a corresponding latching recess or recesses on the annular top end wall member.

Figure 2:
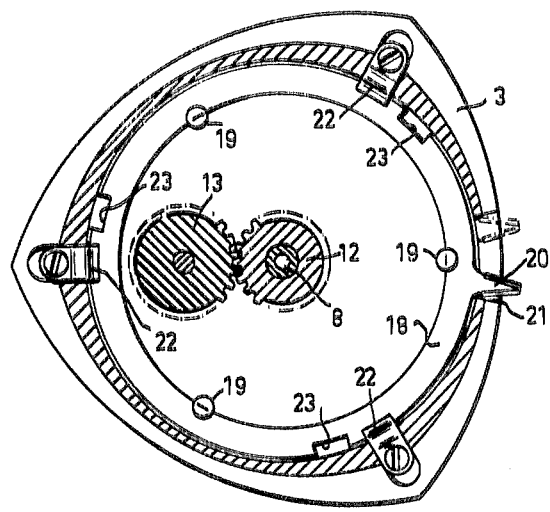
Figure 3:
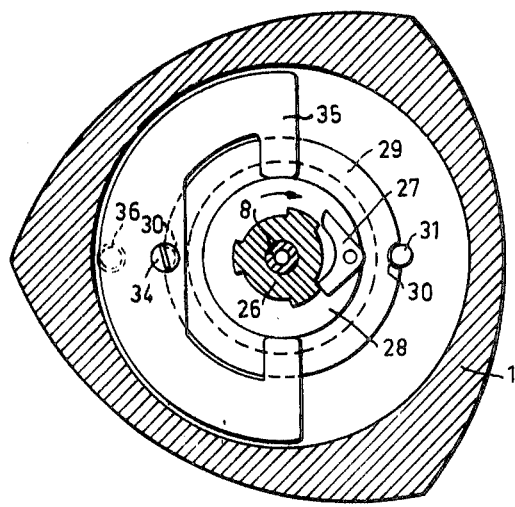

Further characterizing features and details of the present invention will be apparent from the following description which is made with reference to an embodiment of the invention illustrated diagrammatically in the accompanying drawing, in which FIG. 1 is an axial section through a reel constructed in accordance with the invention, FIG. 2 is a section through the line II—II in FIG. 1, FIG. 3 is a section through the line III—III in FIG. 1.

The reel framework is formed of a bottom end wall member 1 and a ring-shaped top end wall member 3 securely connected to the member 1 by rigid stays or tie members 2. The inner flange 4 of the line spool is let into the bottom member 1 and the outer flange 5 is let into the top member 3. The barrel 6 of the spool is fitted over a hollow spool shaft or bearing 7 and securely fastened thereto by known means (not shown). The hollow shaft or bearing 7 is mounted for rotation on an inner primary shaft 8, the ends of which protrude beyond the ends of the spool shaft 7. The upper portion of shaft or bearing 7 forms a bearing boss 7a projecting from the spool drum 6 is journaled in a bearing bushing 9 which is affixed in the center of a circular end plate 10, the outer edges of which are from above let into an annular shelf 11 in the opening of the annular top end wall member 3. The spool shaft 7 supports above the bushing 9 a gear 12, the teeth of which mesh with a larger ring of teeth on a double gear 13 journaled on a shaft 14 attached to the end wall plate and the smaller ring of teeth of which mesh with the teeth of a gear 15 which is affixed to the upwardly projecting end of the primary shaft 8 and which is simultaneously rigidly connected with a crank cap 16 provided with an arm 17. The end plate 10 is normally held in position by a locking ring 18 which bears against the upper side of the end wall plate along the periphery thereof and which is guided for rotation coaxially with the plate 10 by virtue of the fact that the inner edge of said ring 18 engages in slots in guide pins 19 fixed to the end plate 10. The locking ring 18 is provided with a projecting grip portion 20 which extends out through a recess 21 in the ring-shaped top wall and serves to facilitate rotation of the locking ring within the limits determined by the movements of the grip 20 within the recess 21. The locking ring is normally held axially in the shelf 11 by overhand tabs 22 which in the exemplary embodiment are screwed in the members 2 of the reel frame. The locking ring is provided with a number of edge recesses 23 which corresponds to the number and disposition of the overhang tabs 23, said recesses being brought in to register with tabs 22 when moving the grip member to the position depicted in chain lines in FIG. 2 to release the end plate 10 which also presents recesses identified at 24 situated beneath the tabs to enable the end plate to be lifted from the ring-shaped top wall member 3.

Secured in the inside of bottom wall 1 is a bearing bushing 25 having an inner diameter which corresponds to the outer diameter of the lower end of the inner primary shaft 8. The lower portion of the spool shaft 7 projecting from the spool is in the form of a toothed ratchet wheel 26 (FIG. 3) which coacts with a pawl 27 mounted on a friction plate 28 so that the shaft 7 can rotate freely relative to the plate 28 when winding in the line but which carries said plate in rotation when playing the line from the spool and on backward rotation of the crank. The edge portion of the friction plate 28 bears against a friction ring 29 which is locked against rotation by edge recesses 30 which cooperate with a pin 31 attached in the end wall and a pin 32 guided for axial movement in said wall. The latter pin 32 is nonrotatably guided, e.g. by a bevelled surface, in the bottom wall member and is threaded on the portion thereof protruding beyond said wall to receive the hub of an adjustment arm 33. A stud 34 screwed into the inner end of pin 32 holds a C-shaped plate 35 with the inwardly projecting ends of its arms against the friction ring 29 which is thereby held in abutment with the friction plate 28. The C-shaped plate 35 bears against a support pin 36 screwed from outside in the bottom wall member 1 at a point radially outside the stud 34.

The described arrangement functions in the following manner. In the exemplified assembled state the crank cap 16, the gear 15 and the primary shaft are driven, when turning handle 17 in the winding direction, at a speed which by virtue of gears 13 and 12 is transmitted amplified to the outer secondary shaft 7 and thereby also the spool 4-6. The ratchet wheel 26 (FIG. 3) is rotated together with the secondary shaft 7 and the spool 4-6 in the direction of the arrow (clockwise) whereupon the pawl rocks backwards and forwards without carrying with it the friction plate 28. When rotating the spool 4-6 the shaft 7 and the ratchet wheel 26 in the opposite direction whether by playing out line or by turning the crank 17 in the opposite direction, the pawl 27 causes the friction ring 28 to rotate relative to the friction ring 29 held by the edge recess 30. The frictional resistance between parts 28 and 29 depends upon firstly the rotative position of the adjusting arm in that rotation of the arm causes axial movement of pin 32 which by means of the stud draws the ends of the C-shaped plate tightly against the friction ring 29 and secondly upon the setting of the support pin 36 which lowers or raises the support point of the C-shaped plate 35. This braking arrangement does not form part of the invention and is known at least in part. It is described with the sole purpose of illustrating how such a ratchet and brake arrangement can be applied to advantage to a fly-fishing reel of the invention. When the reel is in use, the end wall plate 10 is held by cooperation of the locking ring 18 with the tabs 22 positively clamped against the shoulder 11 in the ring-shaped wall member 3.

The relative axial position of the two shafts 7 and 8 is maintained suitably by a simple, easily detached locking means such as the locking plate shown at 37 which bears against the end surface of the ratchet wheel 26 and engages a peripheral groove in the inner shaft 8. Axial movement of the spool 4-6 and the secondary shaft 7 is actively prevented because the bearing bushing 9 in the plate 10 and the gear 12 lie between members fixed on each shaft, i.e. the gear 15 and the spool 4-6. The two shafts are therefore guided both axially and radially at both ends.

Movement of the grip member 20 from the position depicted by chain lines in FIG. 2 to the position also shown by chain lines on the other side of the recess brings edge recess 23 on locking ring 18 into position beneath the overhang tabs, whereupon the end plate 10 together with crank cap 16, transmission means 12-15, spool 4-6 and shafts 7 and 8 can be drawn axially from the ring-shaped end wall, this exposing the entire braking and latching arrangement 27-36.

By removing the locking plate 37 it is then possible to draw the cap 16, gear 15 and inner shaft 8 from the outer shaft 7 to expose the transmission means. Since the shafts 7 and 8 are maintained in relative axial positions, the gear 12 mounted on the shaft 8 need not be fixed radially but need only be guided against rotation relative to the shaft. By removing the locking plate 37 it is thus possible to also dismantle the gear 12, the plate 10 and the spool 4-6 separately from the shift 8. Thus, all components of the reel can be exposed for inspection, cleaning, lubrication and repair by two simple movements of the hand.

What we claim is:

1. A fishing reel of the type having a rotatable spool, a hand crank driving said spool by intermediate gearing comprising, in combination, a bottom wall member (1) rigidly connected by stay members (2) with a ring-shaped wall member (3), a line spool positioned between said wall members, said line spool comprising end flanges (4, 5), a barrel (6) between said flanges and a bearing boss (7a), a primary shaft (8) on which said spool is rotatably mounted, said primary shaft being loosely journaled in said bottom member (1), said primary shaft extending beyond said ring-shaped wall member (3), an end wall plate (10) removably positioned on said ring-shaped member, said end wall plate (10) having a central bearing engaging the bearing boss of said spool shaft and rotatably supporting s speed amplifying gear (13), a gear (12) secured to said bearing boss and in engagement with said amplifying gear (13), a primary drive gear (15) secured on the upper end of said primary shaft (8) and in engagement with said speed amplifying gear (13), crank means driving engaging said primary gear (15), and clamp means (22, 18) holding said plate (10) on said upper wall member (3).

2. A device substantially as set forth in claim 1 and further characterized in that said clamp means consists of an annular member (18) engaging said plate (10) and clips (22) on said ring-shaped wall member (3) engaging said annular member, said annular member having formed thereon recesses or cutout slots (23) so that rotation of said annular member (18) will bring said clips and said recesses into register and thereby release said annular member from said clips to permit disassembly of said plate (10), said primary shaft (8) and said spool (4, 5, 6) from said reel.

3. A device substantially as set forth in claim 1 and further characterized in that said spool has formed on the bottom thereof a ratchet wheel (26) and said ratchet wheel is engaged by a one-way pawl (27), said pawl being mounted on a coaxial rotatable plate, and adjustable friction means engaging said plate.

4. A device substantially as set forth in claim 2 and further characterized in that said spool is axially slidable off the bottom of said primary shaft, and a removable detent in said primary shaft to prevent axial motion of said spool on said shaft whereby said spool may be removed from said shaft when said detent is removed and said spool and shaft are disassembled from said reel.